US012124423B2

(12) United States Patent
Maitra et al.

(10) Patent No.: US 12,124,423 B2
(45) Date of Patent: Oct. 22, 2024

(54) OPTIMIZING THE OPERATION OF A MICROSERVICE CLUSTER

(71) Applicant: HEWLETT PACKARD ENTERPRISE DEVELOPMENT LP, Spring, TX (US)

(72) Inventors: Debloke Maitra, Tomball, TX (US); Paul Day, Houston, TX (US); Derek Perronne, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 159 days.

(21) Appl. No.: 17/957,688

(22) Filed: Sep. 30, 2022

(65) Prior Publication Data
US 2024/0111747 A1 Apr. 4, 2024

(51) Int. Cl.
 *G06F 16/22* (2019.01)
 *G06F 16/23* (2019.01)
 *G06F 16/27* (2019.01)
(52) U.S. Cl.
 CPC ...... *G06F 16/2255* (2019.01); *G06F 16/2358* (2019.01); *G06F 16/27* (2019.01)
(58) Field of Classification Search
 CPC .......................... G06F 16/2255; G06F 16/2358
 See application file for complete search history.

(56) References Cited

U.S. PATENT DOCUMENTS

| 11,126,605 | B2 | 9/2021 | McHugh et al. | |
|---|---|---|---|---|
| 2006/0075323 | A1* | 4/2006 | Singh | G06F 40/186 715/205 |
| 2018/0004777 | A1 | 1/2018 | Bulkowski et al. | |
| 2019/0121793 | A1* | 4/2019 | Huang | G06F 16/1873 |
| 2019/0250929 | A1* | 8/2019 | Pasirstein | G06F 21/602 |
| 2019/0370381 | A1* | 12/2019 | Klein | G06F 16/182 |
| 2021/0281428 | A1* | 9/2021 | Kempf | G06F 21/64 |
| 2022/0197761 | A1 | 6/2022 | Pound et al. | |

FOREIGN PATENT DOCUMENTS

CN 114579664 A 6/2022

OTHER PUBLICATIONS

Cerri, F., et al., "Two clusters in different regions: Active-active", 2022, 20 pages.

* cited by examiner

*Primary Examiner* — Jay A Morrison
(74) *Attorney, Agent, or Firm* — Trop, Pruner & Hu, P.C.

(57) ABSTRACT

Example implementations relate to optimizing operation of microservice clusters comprising multiple nodes, each executing a common self-sufficient microservice instance. The method includes, at a first node having a database instance comprising a plurality of rows and a plurality of columns, calculating a distinct hash per row to create a hash list, each hash identifying data contained in the respective row; publishing a distinct hash and/or the hash list to one or more of the plurality of nodes, each node having respective database instances and respective hash lists; at a second node, comparing the distinct hash and/the hash list published by the first node to the hash list of the second node to identify any missing rows of data; and, in response to identifying, based on the comparison, a missing row(s) in the second node's database instance, updating the second node's database instance to include the missing row(s) of data.

20 Claims, 3 Drawing Sheets

OPTIMIZING THE OPERATION OF A MICROSERVICE CLUSTER

BACKGROUND

Microservices have become an increasingly popular means for offering computing functionality. Microservices are frequently self-sufficient, meaning that all of the functionality necessary to perform their intended purpose, including a database, are contained within the node running the microservice. Where multiple nodes are utilized to run a single microservice, referred to as a microservice cluster, each node within the microservice cluster may be self-sufficient (i.e., may contain all the functionality needed for it to perform its intended purpose, including an instance of a database). This is in contrast, for example, to an architecture in which one or more centralized resources, such as a database, are shared amongst multiple nodes.

BRIEF DESCRIPTION OF THE DRAWINGS

Various examples will be described below with reference to the following figures.

Figure 1:
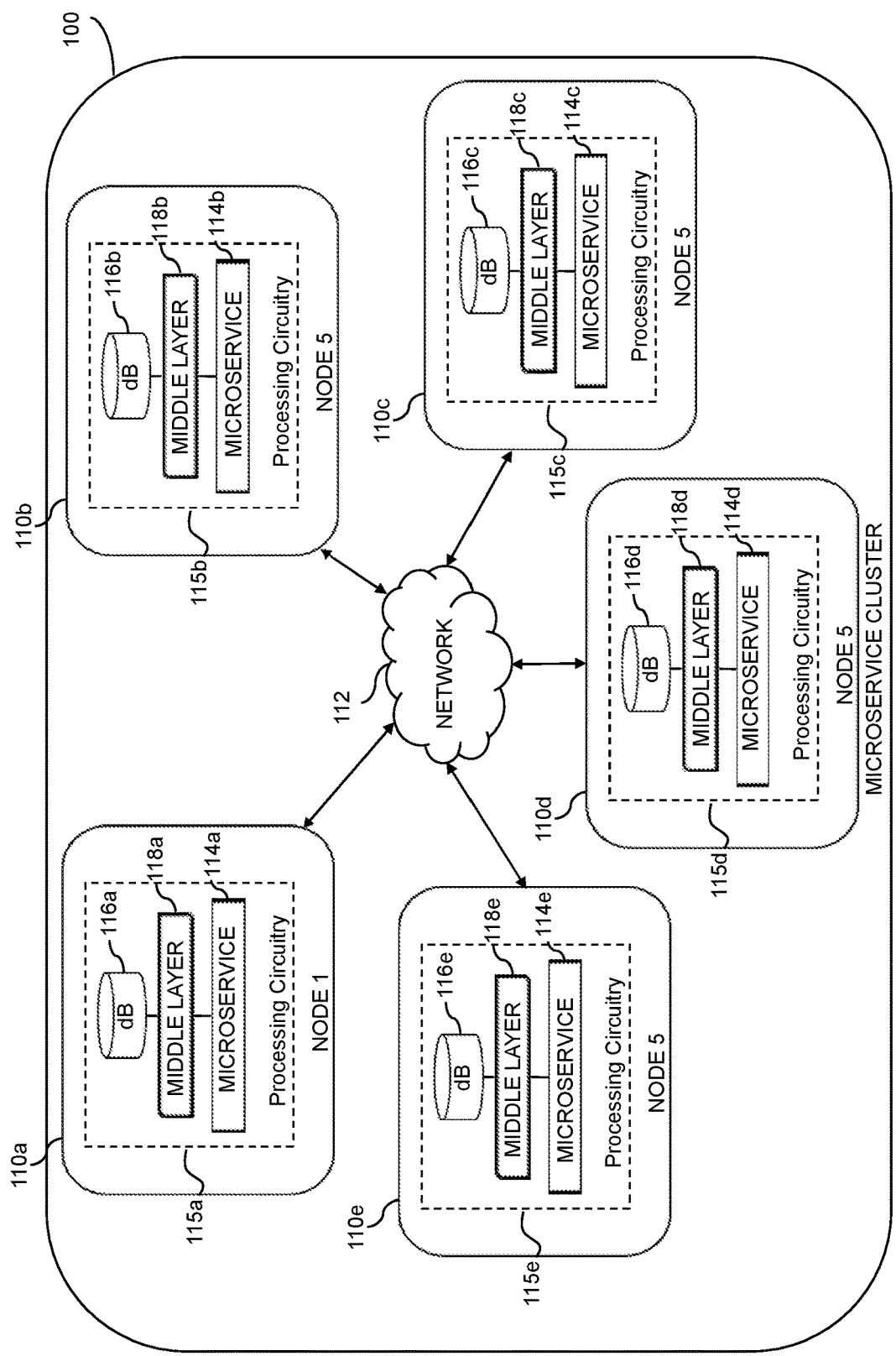
FIG. 1 is a block diagram of an example microservice cluster in accordance with some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Self-sufficient microservices (i.e., those without any external/shared database), such as .NET microservices, often run on multiple nodes within a network, forming a microservice cluster. As used herein, a "node" or "processing node" generally refers to a computing element. The nodes of a microservice cluster may be computer systems in virtual or physical form or one or more components of a computer system such as a controller. The nodes of a microservice cluster, as the term is utilized herein, are each configured to run an instance of a common microservice and operate collaboratively to perform the function or functions of the common microservice. As each node of a microservice cluster may include its own instance of the database, rather than having a single instance of a database shared among the nodes of the cluster, ensuring that the data in each database instance is synchronized and consistent is key to ensuring high availability and to minimize the chance of any data loss during the execution of the microservice across the nodes of the cluster. Thus, any data change in any of the database instances on the nodes of the microservice cluster should be timely and efficiently replicated to the database instances of all other nodes of the microservice cluster. Additionally, any one of a plurality of nodes running a common microservice should be able to recover from temporary or long-time failure with minimal disruption to the cluster, and any new node joining a microservice cluster should be able to initialize or startup without any loss of data for any node in the cluster.

The present disclosure provides for synchronizing data among database instances on a plurality of nodes comprising a microservice cluster (e.g., a .NET microservice cluster) quickly and efficiently, thus optimizing the operation of the microservice cluster. Each of the plurality of nodes comprising the microservice cluster may be configured to run a self-sufficient microservice (that is, a microservice that has its own dedicated database instead of relying on any external or shared database). Each of the plurality of nodes thus may include an instance of the microservice and an instance of a database. In some implementations, the database may be an SQLite database. A middle layer may be positioned between the database instance and the microservice instance for each node of the cluster. This middle layer may be configured to synchronize data between the database instance of the node upon which it resides and the database instances of the other nodes in the microservice cluster, and also to facilitate recovery of the database instance in the event of a failure. In particular, the middle layer of each node may generate hashes representing the contents of their respective database instances (e.g., one hash per row), and the respective middle layers of the nodes may share their respective hashes with one another, thus allowing for each node to become aware of the contents of the database instances of the other nodes comprising the cluster and to update their own database instances as necessary to bring their respective database instances up to date with the others.

For example, the middle layer of a given node may be configured to create a distinct hash for each row in the database based on certain columns in the database table (e.g., primary keys, font keys, timestamps, etc.) that may be defined by the user and/or the microservice. In some implementations, the columns for creating the distinct hash for each row may be selected based on their ability to distinguish the data identified by the hash from other data in the database. In some example implementations, the columns may be selected from primary keys, font keys, and/or timestamps. The aggregate of the hashes created by the middle layer may form a hash list.

As the nodes share their respective hashes with one another, they may be compared to one another to determine if there are any rows of data in any of the database instances that are missing or contain inconsistent data. If any discrepancies are identified, this indicates that data contained in one database instance is not contained in another database instance, and thus the node that lacks the data may add the corresponding data to its local database instance. The missing data may be, for example, copied or updated from one database instance to another. This ensures all nodes contain the same data within their respective database instances.

In some example implementations, each node comprising a microservice cluster may occasionally (e.g., periodically or in response to certain events, such as an update to the database) share its entire hash list with all other nodes in the microservice cluster. In some examples, the hash lists may be shared using an asynchronous messaging service, such as ZeroMQ, ActiveMQ, or RapidMQ, which allows each node to publish its hash list to its local instance of the messaging service. Peer nodes then can subscribe to that messaging service instance to asynchronously receive the hash lists. In some examples, how frequently the nodes of a microservice cluster publish their respective hash lists may be configurable by a user or operator of the microservice. Each of the other nodes of the microservice cluster may receive the respective hash lists published by all the other nodes of the microservice cluster and compare the received respective hash lists to its own hash list to look for any discrepancies. If a discrepancy is located by any particular node of the microservice cluster, that particular node may resolve the discrepancy (i.e., update the data in its own database instance with that of the node having the hash list that alerted it to the discrepancy). In this way, if discrepancies are found among the database instances of nodes within a microservice cluster, such discrepancies may be resolved in real-time or near-real-time. This may allow for efficient recovery of failures and/or the spinning up of new nodes. Because all the nodes are periodically publishing their hash lists, when a node joins (or rejoins) the cluster, for example, because the node is newly being added to the cluster or because the node is recovering from a failure, this node is able to quickly build (or rebuild) its database by reading the published hash lists from all other database instances in the cluster and replicating and/or updating its respective database. In this way, the new node may be able to initialize or startup without any loss of data for any node in the microservice cluster.

In some examples, a node may publish its entire hash list not only to facilitate recovery of failed nodes or spinning up of new nodes but may also publish the entire hash list in response to local database changes to allow for data synchronization between the nodes. That is, in response to a change to the database (e.g., the addition of a new row), the node may update its hash list to reflect the change and then publish its updated hash list, and the other nodes can detect the change by identifying discrepancies between the received hash list and their own hash list (i.e., detect a hash found in the published list that is not present in their own hash list). The other nodes may then update their own local database instances to make a corresponding change to the one detected from the published hash list, e.g., adding a new row.

In some example implementations, instead of a node publishing the entire hash list in response to a change to its local database instance, upon the node receiving the change the middle layer between the microservice and the database instance may create a distinct hash for the particular row (or rows) of the database instance that is affected by the data change. The node that received the change in data may publish the distinct hash for the particular row to all other nodes in the microservice cluster that are running the microservice via the asynchronous messaging service. The nodes within the microservice cluster that receive the published distinct hash may detect that they do not have a hash in their hash list corresponding to the published hash and thus may update their respective database instances with the change in data identified by the distinct hash. In this way, changes to one database instance may be quickly and efficiently propagated to all other database instances in a microservice cluster such that the data may be synchronized in real-time or near-real-time as the microservice is running. Publishing just the hash of the changed row, rather than the entire hash list, when changes are made can help to reduce network traffic and compute overhead.

In some example implementations, a method for optimizing the operation of a microservice cluster may include detecting when a new node in the cluster initiates execution of the microservice (the new node either being added to the cluster or being newly online after a failure) and providing the hash lists from all other database instances in the cluster to the new node for replicating and/or updating its respective database. In this way, the new node may be able to startup without any loss of data for any node in the microservice cluster. In other examples, the existing nodes do not necessarily detect new nodes or provide their hash lists in response to such a detection, but instead may periodically publish their hash lists in the manner described above, and the new nodes can receive the published hash lists as and when they are published by the other nodes.

Thus, examples described herein may provide for efficient real-time synchronization of respective database instances of nodes of a microservice cluster. Real-time synchronization allows for each node to become aware of the contents of the database instances of the other nodes comprising the cluster and to update their own database instances as necessary to bring their respective database instances up to date with the others. Ensuring that data in each database instance is consistent may allow each of the microservices to have the same up-to-date sets of data to operate on, which may be important for the consistent performance of the microservices cluster. In addition, synchronization of the database instances bolsters the cluster's high availability and minimizes the chance of any data loss during the execution of the microservice across the nodes of the cluster. Examples described herein further may provide for efficient recovery of failures and/or spinning up of new nodes. Because all the nodes are frequently publishing their hash lists, when a node joins (or rejoins) the cluster, this node is able to quickly build (or rebuild) its database by reading the published hash lists from all other database instances in the cluster and replicating and/or updating its respective database. In this way, the new node may be able to startup without any loss of data for any node in the microservice cluster. In addition, approaches described herein may provide the aforementioned synchronization and recovery without needing a complicated synchronization algorithm that involves many back-and-forth messages between nodes. In particular, the approaches described herein may allow a node that initially receives a database change to commit the needed change to its database immediately without having to wait for the change to be replicated to the other nodes in the cluster and to receive acknowledgments that the other nodes have also received the replicated database change before the first node can commit the change to its own database instance. Alternative approaches that involve sending multiple messages back and forth between nodes or which require acknowledgment prior to commitment can be complicated and may be particularly ill-suited to microservice clusters which may have many lightweight nodes.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

FIG. 1 is a block diagram of an example microservice cluster 100 in accordance with some implementations of the present disclosure. The illustrated microservice cluster 100 includes five nodes (labeled as node 1 (110a), node 2 (110b), node 3 (110c), node 4 (110d) and node 5 (110e)). It will be understood by those having ordinary skill in the art that the number of nodes illustrated in FIG. 1 is by way of example only and is not intended to be limiting. Any number of nodes in excess of one (i.e., two or more) may comprise a microservice cluster in accordance with implementations of the present disclosure. The nodes 110a, 110b, 110c, 110d, 110e of FIG. 1 are coupled with one another via a network 112.

The nodes 110 may be physical (e.g., bare metal) computing systems, virtual computing systems (e.g., virtual machines, containers, or other virtualized systems), or components of such physical or virtual systems, such as hardware components of and/or software entities instantiated on the systems. In some examples, all of the nodes 110 are physical devices or components thereof, in other examples, all of the nodes 110 are software entities or virtual devices, and in still other examples, a combination of physical and software/virtual nodes 110 may be used together. As non-limiting examples, the nodes 110 may be, may be part of, or may be instantiated on, individual computing devices (e.g., compute servers, storage servers, etc.), nodes of a multi-node computing system (e.g., a composable system, blade server system, converged system, hyperconverged platform, etc.), cloud computing systems, networking devices (e.g., routers, switches), internet-of-things (IoT) devices, or other devices that have processing capabilities (e.g., cameras, sensors, etc.). In some examples, multiple nodes 110 may be part of the same computing device or system. For example, a given computing device or system may be provided with two of the nodes 110, one to act as a primary and the other to act as a backup. For example, in some implementations, the nodes 110 correspond to management devices or controllers of a computing system, such as a Baseboard Management Controller (BMC), a trusted platform module (TPM), or the like, and a given computing device may be provided with two of the nodes 110 to act as a primary and a secondary controller.

As shown in FIG. 1, each node 110 comprises processing circuitry 115 comprising and/or configured to instantiate a .NET microservice 114, a database 116, and a middle layer 118, described in greater detail below, during runtime. In nodes 110, which are discrete physical systems or hardware components, the processing circuitry 115 of a given node 110 may be physically part of and specific to that given node 110. In nodes 110 that are software entities or virtualized systems (e.g., a virtual machine, container, etc.) the processing circuitry 115 may comprise the underlying hardware that instantiates the node 110 (e.g., by executing corresponding instructions) and this hardware may be shared by one or more other nodes 110. Thus, although the processing circuitry 115a-115e is shown separately in FIG. 1, in some examples, some (or even all) of the nodes 110 may share the same processing circuitry 115. The processing circuitry 115 comprises a processing resource (e.g., a processor, a System-on-Chip (SoC), a central processing unit (CPU), a graphical processing unit (GPU), etc.) together with a storage medium storing instructions executable by the processing resource, dedicated hardware (e.g., an application specific integrated circuit (ASIC), a field programmable gate array (FPGA), a complex programmable logic device (CPLD), etc.), or some combination thereof. The instructions and/or the dedicated hardware of the processing circuitry 115 may be configured to instantiate the microservice instance 114, the database instance 116, and the middle layer 118 during runtime to cause the performance of the operations described herein in relation to these entities.

Each node 110 includes an instance of a common self-sufficient microservice 114 running thereon, as well as an instance of a database 116. As each node 110 of the microservice cluster 100 is running the same self-sufficient microservice 114, the data contained in each respective instance of the database 116 should be identical. In some implementations, each instance of the database 116 includes a plurality of rows and a plurality of columns into which the data contained therein is organized. In some implementations, each instance of the database 116 is SQLite. The self-sufficient microservice 114 may be any self-sufficient microservice (e.g., a self-sufficient .NET microservice). In some implementations, the self-sufficient microservice 114 comprises an authentication microservice, such as a cryptographic key or certificate manager. For example, in some implementations, the self-sufficient microservice 114 comprises a cryptographic key or certificate manager that comprises, is part of, or is utilized by, a trusted platform module (TPM) of a computing device.

For each node 110 of the microservice cluster 100, positioned between each respective instance of the self-sufficient .NET microservice 114 and each respective instance of the database 116 is a middle layer 118. It will be understood that, though illustrated as a physical component in the block diagram of FIG. 1, the middle layer 118 is a layer of computing functionality and may not necessarily represent a physical component. As such, references to the middle layer 118 being positioned between the microservice instance 114 and the database instance 116 refer to a logical positioning rather than a physical positioning; for example, the middle layer 118 may be positioned between the microservice instance 114 and the database instance 116 in the sense that the middle layer 118 may be configured to receive or monitor at least certain messages (e.g., commands to change data in the database 116) that are exchanged between the microservice instance 114 and the database instance 116 and/or to act as an intermediary therebetween in relation to those messages.

In some implementations, the middle layer 118 may be configured to calculate a distinct hash for one or more rows of the respective database instance 116 with which it is associated. Each distinct hash may be calculated based on one or more columns of the plurality of columns of the database. The column(s) may be selected by the self-sufficient microservice and/or by a user of the self-sufficient microservice. In some implementations, the column(s) may be selected based on their ability to distinguish the data identified by the hash from other data in the database. At least a portion of the column(s) may include data associated with one of a primary key, a font key, and/or a timestamp. More specifically, in some implementations, the middle layer 118 may be configured to calculate a distinct hash for each row (i.e., one hash per row) of the respective database instance 116 with which it is associated on a periodic basis. In some implementations, in addition to or in lieu of periodically calculating the hashes of all the rows, the hashes of all the rows may be calculated in response to an event, such as a change to the database being detected, a new node being detected, or some other predetermined or user-specified event. In some implementations, in addition to or in lieu of calculating the hashes of all the rows, the middle layer 118 may be configured to calculate a distinct hash for a particular row of a respective database instance 116 with which it is associated when a change in the data of that row is detected (e.g., when an instruction to change the data of the row is sent by the microservice 114 to the database 116). For example, in some implementations in which the microservice 114 is a certificate manager, the microservice 114 may generate a certificate and instruct the database 116 to store the certificate in a given row, and this may trigger the middle layer 118 to generate a distinct hash for that row. In some implementations, the middle layer 118 may be configured to calculate a hash for one or each row of the respective database instance 116 with which it is associated on both a periodic basis and also in response to changes in data in the database. Any and all such variations, and any combination thereof, are contemplated to be within the scope of implementations of the present disclosure.

In some implementations, the middle layer 118 may be configured to aggregate the distinct hashes calculated for each row of each respective database instance to create a hash list for each respective database instance 116. In some examples, the hash list may be maintained and updated to reflect a current state of the database. This maintenance and updating of the hash list may include, updating the entire hash list by (re)calculating the hashes for all of the rows in the database 116 (periodically or in response to specified events), (re)calculating hashes only for the row(s) for which changes have (or will be) made, or a combination of these (e.g., periodically (re)calculating the hashes for all of the rows, and in between such periodic recalculations calculating hashes only for rows that have been changed (e.g., newly added rows) when such changes occur).

In some implementations, the middle layer 118 may be configured to publish individual hashes and/or hash lists to the other nodes in the microservice cluster. In some implementations, the middle layer 118 may be configured to publish one or more distinct hashes and/or hash lists to the other nodes in the microservice cluster using an asynchronous messaging service. The asynchronous messaging service may be, for example, ZeroMQ, RapidMQ, ActiveMQ, or any asynchronous messaging service that can be implemented in a self-sufficient microservice. In some examples, the hash list that comprises hashes for each row of a database instance may be maintained in a non-ephemeral data structure (e.g., table, array, list, etc.) that is either part of, or accessible to, the asynchronous messaging service and the asynchronous messaging service of a given node may be configured to communicate the information stored in this data structure (i.e., which includes the hash list) to the peer nodes that have subscribed to the given node. (non-ephemeral as used here refers to the data structure being maintained and updated during operation, rather than being discarded after each communication, but does not necessarily require that the data structure be permanently or persistently stored). The act of adding information to this data structure may be referred to herein as "publishing," and thus references herein to publishing the hash lists may refer to writing one or more hashes to the data structure. In some examples, the asynchronous messaging service may occasionally transmit the contents of the data structure (i.e., the hash list) to the nodes, for example, periodically and/or whenever the data structure is changed (e.g., when new hashes are added to the hash list). In some examples, even if only one hash has been added to or changed in the hash list (e.g., because data in a corresponding row in the database has been changed), the asynchronous messaging service may transmit the entire hash list including the added or changed hash. In some examples, the asynchronous messaging service may transmit only the changes to the hash list (e.g., the new hashes) as and when they are published. In some examples, the asynchronous messaging service may both transmit the entire hash list (e.g., periodically) and transmit only the changes (e.g., as and when the changes are published). In other examples, rather than maintaining the hash list in a non-ephemeral data structure that the asynchronous messaging service accesses and shares, the middle layer instead sends the hashes to the asynchronous messaging service for transmission as and when needed, the messaging service transmits the hashes, and no memory of the hashes is maintained by or for the messaging service (although the middle layer 118 may maintain its own record thereof). In these examples, publishing may refer to the act of sending the hashes to the asynchronous messaging service for transmission.

In some implementations, the middle layer 118 may be configured to receive distinct hashes and/or hash lists published by nodes comprising other nodes in the microservice cluster 100 and compare the received distinct hashes and/or hash lists to its local hash list. If a discrepancy is found to exist between a distinct hash or hash list published by a peer node in the microservice cluster 100 and the receiving node's hash list, the middle layer 118 may be configured to update the respective database instance 116 with which it is associated. The update to the database instance 116 may include adding or changing data in one or more rows of the database 116, wherein the rows that are updated correspond to the identified discrepancies, i.e., rows corresponding to hashes that were present in the received hash list but not present in the local hash list. The middle layer 118 also may calculate a hash for any newly added/changed rows in its database and add the new hash(es) to its own local hash list, to bring it up to date. In some implementations, the database instances 116 may be configured such that rows cannot be deleted or changed. Instead, if the information stored in a row needs to change, then a new row is added with that information, and the previous row is maintained but flagged as invalid so that it is no longer read by the database. Thus, because every change to the database consists of adding a new row, whenever a node identifies that a hash is present in a neighboring nodes hash list that is not present in the node's own local hash list, the node can know that the neighboring node's hash list is the more up-to-date list, and thus the local node can safely add the same row to its database and make any other needed changes (e.g., if the new row includes information identifying that an existing row should be invalidated, then the local database may accordingly invalidate that existing row). Thus, there is no problem with the nodes not being sure which hash list is the most up-to-date or the authoritative list that they should follow, as whatever list has the most hashes will always be considered the authoritative or most up-to-date list.

In some implementations, the calculating of the hashes and the publishing of the hashes are not necessarily synchronized. For example, in some implementations, the hashes (of a single row or of the entire database) may be calculated whenever a change is made to the database, but the entire hash list may be shared periodically without necessarily also recalculating the entire hash list each time the database is shared.

Figure 2:
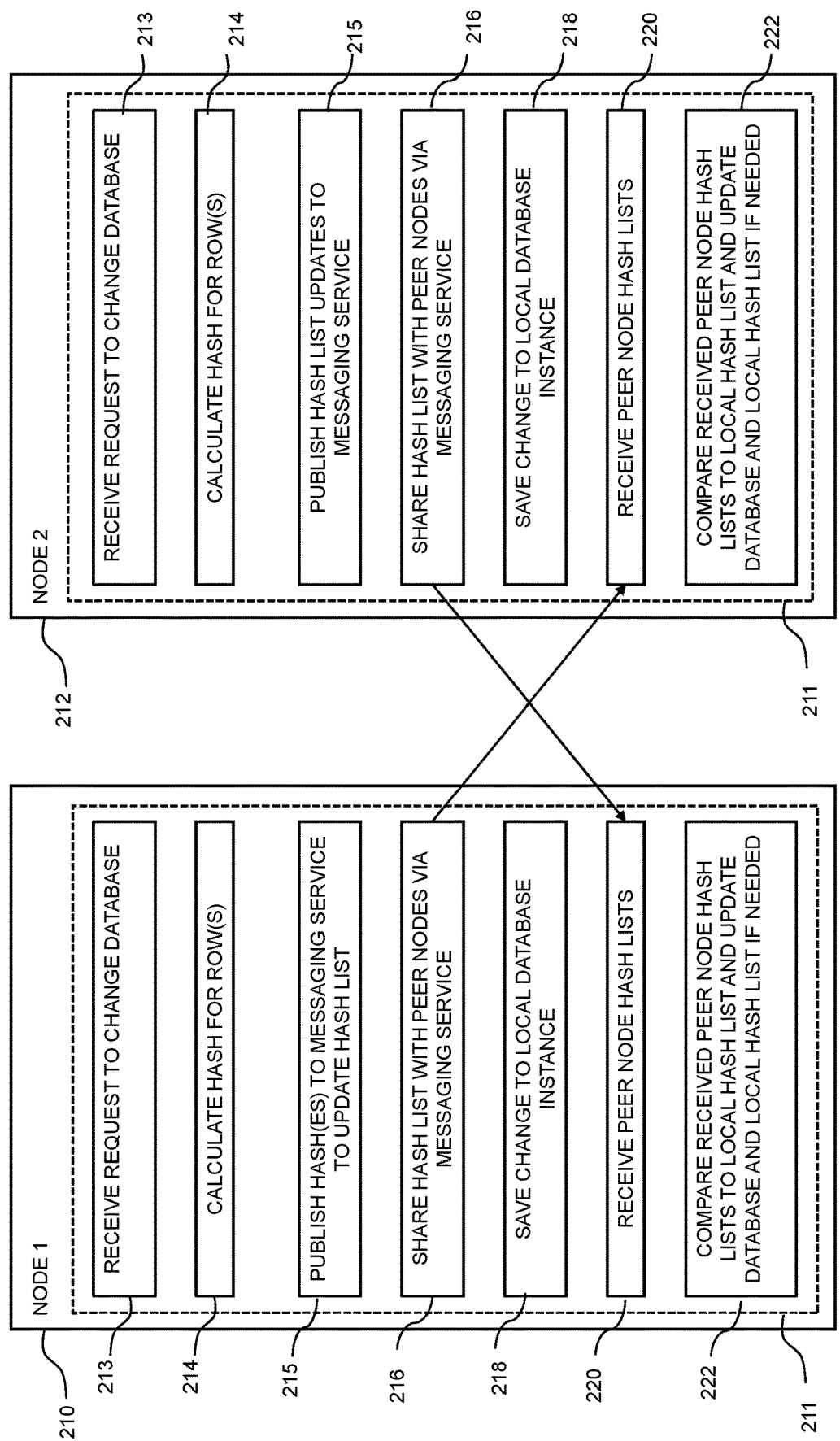
FIG. 2 is a block diagram illustrating the communication and updating between cluster nodes, in accordance with some implementations of the present disclosure.

With reference to FIG. 2, a block diagram is illustrated showing two example nodes 210 and 212, which may be specific configuration examples of the nodes 110 described above. FIG. 2 also illustrates interactions that may occur between nodes of a microservice cluster (e.g., the microservice cluster 100 of FIG. 1), including the communication of a database change at one node and the implementation of the change at another node of the microservice cluster, in accordance with some implementations of the present disclosure. As illustrated, FIG. 2 includes two nodes, Node 1 (210) and Node 2 (212). It will be understood by those having ordinary skill in the art that the number of nodes illustrated in FIG. 2 is by way of example only and is not intended to be limiting. Any number of nodes in excess of one may comprise a microservice cluster in accordance with implementations of the present disclosure. The nodes 210, 212 of FIG. 2 may be coupled with one another via a network (not shown). Additionally, the nodes 210, 212 of FIG. 2 may include a microservice instance (not shown), a middle layer (not shown), and a database instance (not shown), which may be similar to the microservice instances 114, middle layers 118 and database instances 116 as described above with regard to FIG. 1. The functionality described in FIG. 2 may be performed by the middle layer. The nodes 210 and 212 may be configured to perform the functionality illustrated in FIG. 2 by virtue of comprising instructions that are executable by a processing resource to cause the performance of the functionality, by virtue of comprising dedicated hardware configured to perform the functionality or some combination of the two. In examples in which the functionality is provided via software instructions, instructions corresponding to the functionality illustrated in FIG. 2 may be stored a non-transitory storage medium 211 of the nodes 210. In some examples, the non-transitory storage medium 211 and the instructions stored thereon may be part of the processing circuitry of a node, such as the processing circuitry 115 illustrated in FIG. 1. In some implementations, the non-transitory storage medium 211 and the instructions stored thereon may be provided separately from other components of the node, such as in a computer program product. The functionality described in FIG. 2 is illustrated as being performed by both Node 1 (210) and Node 2 (212). However, to avoid duplicative descriptions, the functions of just one of the nodes 210, 212 will be described below, except in instances where interactions between nodes are being described. The functions may be performed simultaneously or asynchronously by Node1 (210) and Node 2 (212). It will be understood, however, that the functionality may be performed asynchronously or by one node at a time or only one node within the scope of implementations of the present disclosure.

In block 213, the middle layer may receive (or detect) a request or instruction from the microservice to change the data contained within the database instance associated with a node 210, such as for example a request/instruction to add a new row entry.

In block 214, the node may calculate a distinct hash for one or respective hashes for all rows of its database. In particular, in some examples, the receiving of the change in block 213 may trigger the middle layer between the microservice instance of the node and the database instance of the node to create a distinct hash (or distinct hashes) for the particular row (or rows) of the database instance that is (are) affected by the data change 216. In some examples, in addition to calculating the hash (or hashes) for the row (or rows) that have experienced the change, the middle layer may also calculate the hashes of all the other rows in the database. Furthermore, in some examples, the calculating of the hashes in block 214 may be performed periodically, instead of or in addition to calculating the hashes in response to the change to the database. For example, an SHA-265 hash may be calculated based on the values stored in one or more columns of the affected row, in some implementations. Other types of hashes may be used as well.

Block 215 comprises the node that received the change in the database publishing one or more hashes from its hash list to an asynchronous messaging service of the node. In some examples, block 215 comprises publishing just the hash (or hashes) of the row (or rows) that were the subject of the change in block 213. In some examples, block 215 comprises publishing the entire hash list. In some examples, a hash list comprising hashes for each row of the database is maintained for or by the messaging service, and the publication of the newly calculated hashes to the messaging service comprises updating the hash list to include the new hash. In other examples, instead of storing and maintaining a copy of the hash list, the hash list may be shared with the messaging service dynamically on an ad hoc basis. In some examples, the publication of the hash(es) to the asynchronous messaging service in block 215 may occur in response to the change to the database in block 213, and the published hash(es) may include hashes newly calculated in block 214 for the changed rows. In some examples, the publication of the hash(es) to the asynchronous messaging service in block 215 may occur periodically (e.g., with all of the hashes of the hash list being published) and/or in response to some other event (e.g., the detection of a new node). In some implementations, the asynchronous messaging service may be one of ZeroMQ, ActiveMQ, or RapidMQ.

In block 216, individual hashes (e.g., the hashes of changed rows) and/or the entire hash list may be shared with peer nodes via the messaging service. For example, the messaging service may utilize a publish/subscribe approach in which each node may have their own local instance of the messaging service and each node may subscribe, via their respective local instance of the messaging service, to the messaging services of the other nodes. With this arrangement, as hashes are published to the messaging service, the messaging service of that node will share (e.g., transmit) the newly added hashes, the entire hash list (including the change), or both to all of the nodes that have subscribed to it. More specifically, in some examples, in response to a new hash being published to the messaging service in block 215, in block 216 that new hash may be transmitted to the other nodes. In some examples, in response to a new hash being published to the messaging service in block 215, the entire hash list (including the new hash) will be transmitted to the other nodes. In some examples, new hashes are transmitted to other nodes as and when those new hashes are published (e.g., in response to changes to the database), and in addition, the entire hash list is also transmitted on other occasions (e.g., periodically and/or in response to detection of a new node). This is indicated in FIG. 1 by the arrows, with Node 1 sharing its new hashes and/or entire hash list with Node 2 and vice versa.

In block 218, the requested change to the database instance received in block 213 may be saved to the database. This may occur at any time after block 213, such as before the performance of block 214, between the performance of blocks 214 and 215, between the performance of blocks 215 and 216, after the performance of block 216, or simultaneously with any of these.

In block 220, the node receives the individual hashes or hash lists shared from their peers. For example, as noted above, the nodes may have local instances of the messaging service, and these may be used to receive the hashes or hash lists transmitted via the messaging services of the other nodes. For example, in FIG. 1 Node 1 (210) receives the hash list from Node 2 (212) and vice versa.

In block 222, a node that receives a peer's individual hashes or hash list via the messaging service may update their respective database instance based thereon. Specifically, the middle layer may compare the received hashes or hash list with the node's own local hash list and identify any discrepancies therebetween. In relation to individual hashes that are received from a peer, a discrepancy would include the node's local hash list not containing a match for the received individual hash. In relation to a received hash list received from a peer, a discrepancy would include a hash appearing in the received hash list which does not appear in the local hash list. Such a discrepancy may reflect one or more rows in the peer node's database instance that are not present in the local database instance and thus based on identifying these discrepancies, the middle layer may identify corresponding changes that need to be made to the local database instance to bring it into a matching state with its peer's. Because the hashes uniquely identify the rows of the database, the local node can deduce from the hashes the information that it needs to add to its local database instance. In this way, changes to one database instance may be quickly and efficiently propagated to all other database instances in a microservice cluster such that the data may be synchronized in real-time or near-real-time as the microservice is running.

Above, the receiving of the peer node hash lists (block 220) and comparing the received hash lists to the local hash lists and updating the database accordingly (block 222) are described in the context of a peer node making a change to its database and sending the hash list as a result. However, blocks 220 and 222 may be performed in other contexts as well. For example, when a node starts executing the microservice or joins a cluster, either because it is a new node or an existing node recovering from a failure (e.g., a network failure, a power failure, etc.), then that node may, as part of joining the cluster, subscribe to the messaging service of the other nodes. This may cause the messaging service of those nodes to transmit the most current version of their hash lists (block 216), or alternatively, the peer nodes may transmit their hash lists as part of a periodic transmission cadence (in which case, the new or recovering node may need to wait for a next transmission). Once the hash lists are received by the new or recovering node (blocks 220), the functions of block 222 as described above may be performed.

Figures 3, 4:
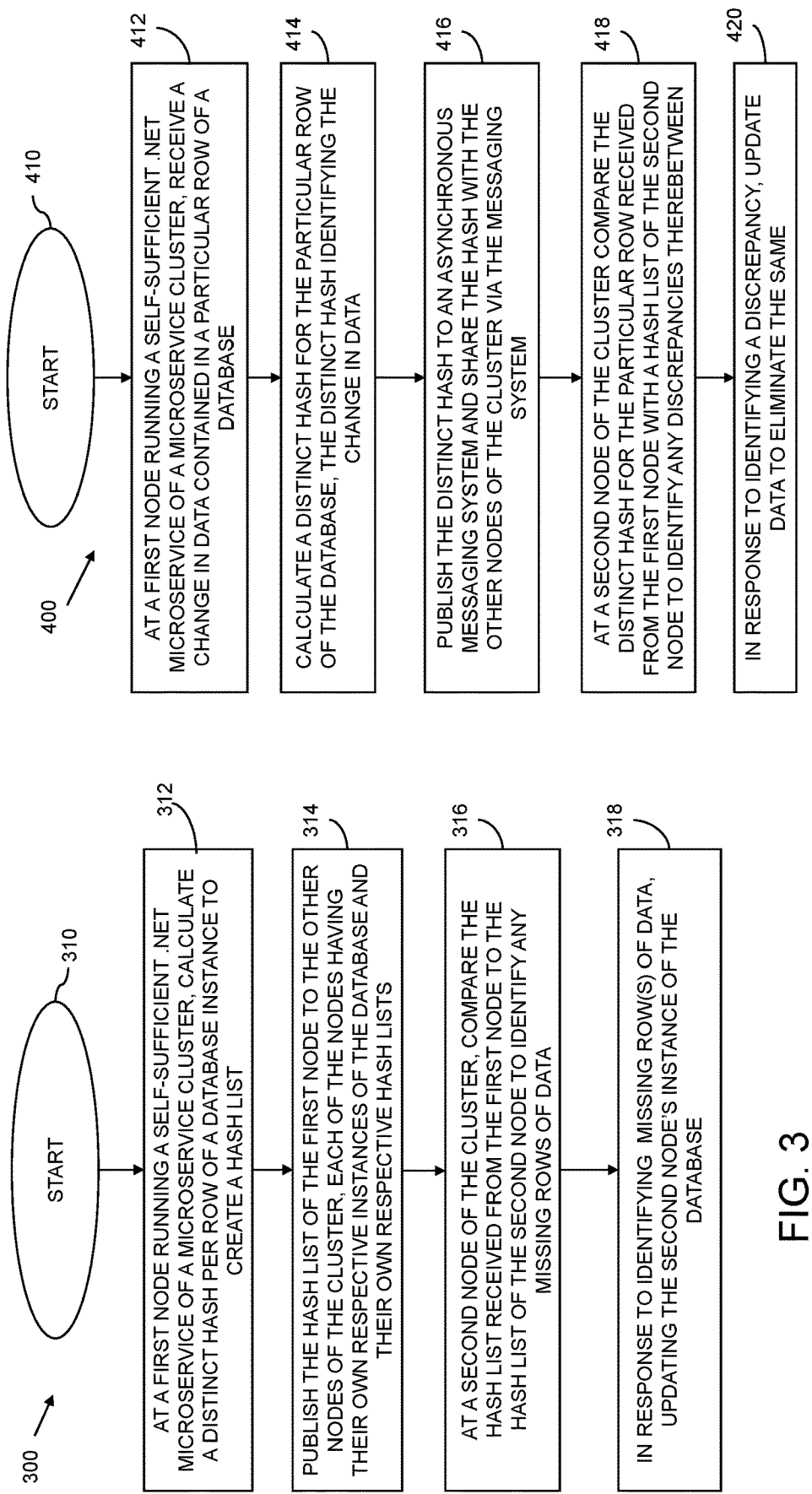
FIG. 3 is a flow diagram showing an illustrative method for optimizing the operation of a microservice cluster, in accordance with an example implementation of the present disclosure.
FIG. 4 is a flow diagram showing an illustrative method for optimizing the operation of a microservice cluster, in accordance with an example implementation of the present disclosure.

FIG. 3 is a flow diagram showing an illustrative method 300 for optimizing the operation of a microservice cluster in accordance with an example implementation of the present disclosure. The method begins at step 310 and continues to step 312. At step 312, a distinct hash may be calculated for each of a plurality of rows of a database instance at a first node of a microservice cluster that is running a self-sufficient microservice to create a hash list. Each distinct hash may identify data contained in the row to which the hash corresponds. Each distinct hash may be calculated based on one or more columns of the plurality of columns of data. The one or more columns of the plurality of columns may be selected by the self-sufficient microservice. At least a portion of the one or more columns of the plurality of columns may include data associated with one of a primary key, a font key, and/or a timestamp. In some implementations, the database may be an SQLite database. In some examples, the hash list is created by calculating or recalculating new hashes for all of the rows of the database at one point in time. In some examples, the hash list is created piecemeal over time; for example, as new rows are added to the database, individual hashes for the new rows may be calculated and appended to the existing hash list to grow the hash list one hash at a time.

At step 314, the hash list of the first node may be published to each of a plurality of other nodes in the microservice cluster (e.g., publish the hash list to an asynchronous message service of the first node, which then, in turn, shares the hash list with the other nodes), each of the plurality of other nodes also running the self-sufficient microservice. Each of the plurality of nodes may include a respective instance of the database and a respective hash list associated with the respective instance of the database. In some examples, the publishing of step 314 may be performed directly in response to the creation of the hash list in step 312. In some examples, the publishing of step 314 may be performed in response to an event or condition other than step 312, such as periodically. In other words, while step 314 may be performed after step 312, in some examples step 312 does not itself trigger the performance of step 314.

At step 316, the hash list for the first node of the microservice cluster may be received by a second node of the cluster and may be compared to the respective hash list of the second node to identify any missing rows of data (i.e., rows of data that are present in the first node's instance of the database but not present in the second node's instance of the database).

At step 318, in response to identifying, based on the comparison, one or more missing rows of data, the second node's instance of the database may be updated (e.g., to add the missing rows). In some implementations, updating the instance of the database and/or the respective instance of the database comprising the one or more missing rows of data may comprise replicating data from the instance of the database and/or the respective instance of the database that contains the one or more rows of data that are missing from the other of the instance of the database or the respective instance of the database.

FIG. 4 is a flow diagram showing an illustrative method 400 for optimizing the operation of a microservice cluster in accordance with an example implementation of the present disclosure. The method begins at step 410 and continues to step 412. At step 412, a change may be received in the data contained in a particular row of a plurality of rows of data in a database instance of a microservice cluster that is running a self-sufficient microservice. In some implementations, the database may be an SQLite database.

At step 414, a distinct hash may be calculated for the particular row of the plurality of rows of data, the distinct hash identifying the change in data. Each distinct hash may be calculated based on one or more columns of the plurality of columns of data. The column(s) may be selected by the self-sufficient microservice. At least a portion of the column(s) may include data associated with one of a primary key, a font key, and/or a timestamp.

At step 416, the distinct hash may be published to each of the plurality of nodes in the microservice cluster using an asynchronous messaging system. Each of the plurality of nodes may include a respective instance of the database and a respective hash list. In some implementations, the asynchronous messaging system may comprise at least one of ZeroMQ, RapidMQ, or ActiveMQ.

At step 418, a second node may receive the distinct hash from the first node and the distinct hash for the particular row may be compared with the respective hash list of the second node to identify any discrepancies therebetween.

At step 420, in response to identifying, based on the comparison, a discrepancy at the particular row identified by the distinct hash in one or more of the respective instances of the database, data at the one or more respective instances of the database may be updated to eliminate the discrepancy.

In the technical description herein, numerous specific details are set forth in order to provide a thorough understanding of example implementations. It will be apparent, however, to one skilled in the art that implementations described herein may be practiced without some of these specific details. In other instances, well-known structures and devices are shown in block diagram form.

The terminology used herein is for the purpose of describing example implementations only and is not intended to be limiting. As used herein, the singular forms "a," "an," and "the" are intended to include the plural forms as well, unless the context clearly indicates otherwise. The term "plurality," as used herein, is defined as two, or more than two. The term "and/or" as used herein refers to and encompasses any and all possible combinations of one or more of the associated listed items. As used herein, the term "includes" means includes but not limited to, and the term "including" means including but not limited to. The term "based on" means based at least in part on. If the specification states a component or feature "may," "can," "could," or "might" be included or have a characteristic, that particular component or feature is not required to be included or have the characteristic. As used in the description herein, the meaning of "in" includes "in" and "on" unless the context clearly dictates otherwise.

The processing described herein with reference to FIGS. 1 through 4 may be implemented in the form of executable instructions stored on a machine-readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computing systems or nodes of various forms, such as the systems described above with reference to FIGS. 1 and 2.

The technology described herein includes various steps, examples of which have been described above. As described further above, these steps may be performed by hardware components or may be embodied in machine-executable instructions, which may be used to cause a processor programmed with the instructions to perform the steps. Alternatively, at least some steps may be performed by a combination of hardware, software, and/or firmware.

The technology described herein may be provided as a computer program product, which may include a tangible machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/ machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

In the foregoing description, numerous details are set forth to provide an understanding of the subject matter disclosed herein. However, implementations may be practiced without some or all these details. Other implementations may include modifications and variations from the details discussed above. It is intended that the following claims cover such modifications and variations.

What is claimed is:

1. A method for optimizing operation of a microservice cluster comprising a plurality of nodes, the plurality of nodes executing instances of a common microservice, the method comprising:
   at a first node of the microservice cluster, wherein the first node has a first instance of a database that comprises a plurality of rows of data and a plurality of columns of data, calculating a distinct hash based on content per row to create a first collection of hashes, each distinct hash of the first collection of hashes identifying data contained in a respective row of the plurality of rows;
   to update data in a first row of the plurality of rows in the first instance of the database, invalidating, at the first node, the first row and adding a new row to the plurality of rows, the new row containing the updated data and the first collection of hashes containing a hash of the new row;
   publishing the first collection of hashes to a second node of the plurality of nodes of the microservice cluster, wherein each node of the plurality of nodes has a respective instance of the database and a respective collection of hashes associated with the respective instance of the database;
   at the second node of the microservice cluster, comparing the first collection of hashes published by the first node to a second collection of hashes associated with a second instance of the database at the second node to identify any missing rows of data;
   based on the comparison identifying one or more missing rows of data in the second instance of the database at the second node, synchronizing, by the second node, the second instance of the database with the first instance of the database by updating the second instance of the database at the second node to include the one or more missing rows of data including the new row added at the first node; and
   collaboratively performing functions of the common microservice by the instances of the common microservice using synchronized instances of the database in the plurality of nodes in a system comprising hardware processors.

2. The method of claim 1, wherein the updating of the second instance of the database at the second node comprises replicating data from the first instance of the database at the first node.

3. The method of claim 1, wherein each distinct hash of the first collection of hashes is calculated based on one or more columns of the plurality of columns of data.

4. The method of claim 3, wherein the one or more columns of the plurality of columns are selected by the common microservice.

5. The method of claim 1, wherein the first instance of the database is configured such that rows of the first instance of the database cannot be changed, wherein the data in the first row of the plurality of rows in the first instance of the database is updated by invalidating the first row and adding the new row.

6. The method of claim 1, wherein the publishing and the comparing are performed based on detecting an addition of a new node to the microservice cluster.

7. The method of claim 1, wherein the publishing and the comparing are performed in response to detecting a new initialization of the common microservice.

8. A non-transitory computer-readable storage medium comprising instructions that upon execution cause one or more processors to:
at a first node of a microservice cluster comprising a plurality of nodes including the first node, wherein each of the plurality of nodes runs an instance of a common microservice and the first node has a first instance of a database that comprises a plurality of rows of data and a plurality of columns of data, calculate a distinct hash based on content per row to create a first collection of hashes, each distinct hash of the first collection of hashes identifying data contained in a respective row of the plurality of rows;
to update data in a first row of the plurality of rows in the first instance of the database, invalidate, at the first node, the first row and add a new row to the plurality of rows, the new row containing the updated data and the first collection of hashes containing a hash of the new row;
publish, by the first node, the first collection of hashes to a second node of the plurality of nodes;
at the second node, compare the first collection of hashes published by the first node to a second collection of hashes associated with a second instance of the database at the second node;
based on the comparison identifying one or more missing rows of data in the second instance of the database at the second node, synchronize, by the second node, the second instance of the database with the first instance of the database by updating the second instance of the database at the second node to include the one or more missing rows of data including the new row added at the first node; and
collaboratively perform functions of the common microservice by the instances of the common microservice using synchronized instances of the database in the plurality of nodes.

9. The non-transitory computer-readable storage medium of claim 8, wherein the first instance of the database is configured such that rows of the first instance of the database cannot be changed, wherein the data in the first row of the plurality of rows in the first instance of the database is updated by invalidating the first row and adding the new row.

10. The non-transitory computer-readable storage medium of claim 8, wherein the publishing is performed based on detecting an addition of a new node to the microservice cluster.

11. The non-transitory computer-readable storage medium of claim 8, wherein the common microservice is a common self-sufficient microservice, and each instance of the common self-sufficient microservice at a respective node of the plurality of nodes performs functions using a respective synchronized instance of the database without relying on an external or shared database.

12. The non-transitory computer-readable storage medium of claim 8, wherein the publishing of the first collection of hashes by the first node uses an asynchronous message service.

13. The non-transitory computer-readable storage medium of claim 8, wherein each distinct hash of the first collection of hashes is calculated based on multiple columns of the plurality of columns of data, the multiple columns comprising a timestamp column containing timestamps.

14. A system comprising:
a plurality of nodes of a microservice cluster; and one or more hardware processors to run an instance of a common microservice in each node of the plurality of nodes, wherein a first node of the plurality of nodes comprises a first instance of a database comprising a plurality of rows of data and a plurality of columns of data,
wherein the first node is to:
calculate a distinct hash based on content per row to create a first collection of hashes, each distinct hash of the first collection of hashes identifying data contained in a respective row of the plurality of rows;
to update data in a first row of the plurality of rows in the first instance of the database, invalidate the first row and add a new row to the plurality of rows, the new row containing the updated data and the first collection of hashes containing a hash of the new row;
publish the first collection of hashes to a second node of the plurality of nodes;
wherein the second node is to:
compare the first collection of hashes published by the first node to a second collection of hashes associated with a second instance of the database at the second node;
based on the comparison identifying one or more missing rows of data in the second instance of the database at the second node, synchronize, by the second node, the second instance of the database with the first instance of the database by updating the second instance of the database at the second node to add the one or more missing rows of data including the new row added at the first node,
wherein the instances of the common microservice are to collaboratively perform functions of the common microservice by using synchronized instances of the database in the plurality of nodes.

15. The system of claim 14, wherein updating the second instance of the database at the second node comprises replicating data from the first instance of the database of the first node.

16. The system of claim 14, wherein each distinct hash is calculated based on multiple columns of the plurality of columns of data, the multiple columns comprising a timestamp column containing timestamps.

17. The system of claim 14, wherein the first instance of the database is configured such that rows of the first instance of the database cannot be changed, wherein the data in the first row of the plurality of rows in the first instance of the database is updated by invalidating the first row and adding the new row.

18. The system of claim 14, wherein the publishing is performed based on detecting an addition of a new node to the microservice cluster.

19. The system of claim 14, wherein the database is a SQLite database.

20. The system of claim 14, wherein the common microservice is a common self-sufficient microservice, and each instance of the common self-sufficient microservice at a respective node of the plurality of nodes performs functions using a respective synchronized instance of the database without relying on an external or shared database.

\* \* \* \* \*